United States Patent Office 3,438,981
Patented Apr. 15, 1969

3,438,981
DIBENZOOXEPINE AND DIBENZOTHIEPINE DERIVATIVES
Kurt Stach, Mannheim, Germany, assignor to C. F. Boehringer & Soehne GmbH, Mannheim-Waldhof, Germany
No Drawing. Continuation-in-part of application Ser. No. 378,046, June 25, 1964. This application Aug. 17, 1967, Ser. No. 661,182
Claims priority, application Germany, July 9, 1963, B 72,596
Int. Cl. C07d 29/12, 67/00; A61h 27/00
U.S. Cl. 260—240                                    3 Claims

ABSTRACT OF THE DISCLOSURE

A novel class of compounds is disclosed which are possessed of muscle relaxing and tranquilizing activity. These compounds have the formula:

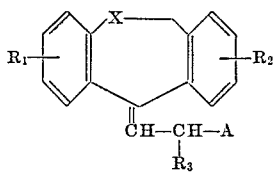

wherein X is a sulfur or oxygen atom, $R_1$ and $R_2$ are each hydrogen, halogen, trifluoromethyl, alkyl, acyl, alkoxy or alkylmercapto, $R_3$ is hydrogen or lower alkyl and A is amino and the acid addition and quaternary ammonium salts thereof.

---

The most preferred compounds are those wherein X is oxygen, $R_2$ is hydrogen, $R_1$ is hydrogen or halogen and A is 4-($\beta$-hydroxyethyl)-piperidino.

This application is a continuation-in-part of application Ser. No. 378,046 filed June 25, 1964 now abandoned.

This invention relates to a process for preparing a series of basic dibenzooxepine and dibenzothiepine derivatives and also relates to novel basic dibenzooxepine and dibenzothiepine derivatives having utility as sedatives, tranquilizers, and antiemetics. Still further, the invention relates to new dibenzo-[b,e]-oxepine (or -thiepine)-11-ones of use as intermediates in the preparation of the basic dibenzooxepine and dibenzothiepine derivatives.

Compounds of this invention have been found useful in excitatory conditions based on hypothalamic discharge, as muscle relaxants and in the relief from mental tension. Specifically, the compounds have been found to be highly effective in psychiatric pharmacotherapy on account of their psychotropic effects and in particular their tranquilizing action. Drugs which have tranquilizing action with few side effects as in the instant case are particularly valuable as pharmacodynamic agents.

The process of the invention is directed to the preparation of basic dibenzo-[b,e]-oxepine and dibenzo-[b,e]-thiepine derivatives represented by Formula I

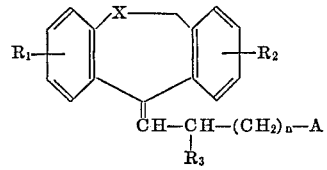

wherein X represents oxygen or a sulfur atom, each of $R_1$ and $R_2$ represents hydrogen, halogen, trifluoromethyl, alkyl, alkoxy, alkylmercapto or acyl, $R_3$ represents hydrogen or lower alkyl, A represents a basic group, i.e., an amino radical, and $n$ is 0 or 1.

The amino group A represents primary, secondary, and tertiary amino radicals which are non-aromatic in character. It includes dialkylamino radicals, such as diethylamino, diamylamino, dihexylamino, diisohexylamino, methylpropylamino, methylbutylamino, ethylpropylamino, and similar radicals. The amino group A may contain substituted alkyl radicals such as $\beta$-hydroxyethyl, $\beta$-chloroethyl, gamma-hydroxypropyl, $\beta$,gamma-dihydroxypropyl, $\beta$-acetoxyethyl, $\beta$-bromoethyl, gamma-bromopropyl, N-aryl or N-aralkyl radicals and the like. The amino radical A also includes non-aromatic heterocyclic amino radicals such as pyrrolidino, piperidino, morpholino, 4-methylpiperazino, methylpyrrolidino, dimethylpyrrolidino, and related saturated heterocyclic amino radicals. The amino radical A includes as well heterocyclic radicals having a di or tri-methylene bridge as for example piperidines having a bridge in the 2,6-position, such as N-nortropans, N-norgranatans, N-nortropanones, N-norgranatanones, N-nortropanoles, and N-norgranatanoles.

In United States patent application Ser. No. 227,552, filed Oct. 1, 1962, a process for the preparation of basic dibenzo-[b,e]-oxepine and -thiepine derivatives of the following formula:

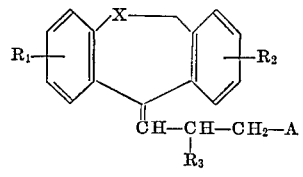

wherein X, $R_1$, $R_2$, $R_3$ and A are as above defined, is described, in which a dibenzo-[b,e]-oxepine-11-one or dibenzo-[b,e]-thiepine-11-one having Formula II

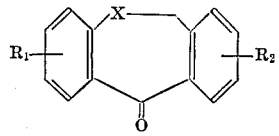

wherein X, $R_1$ and $R_2$ are as above defined, is reacted with a Grignard compound of the formula $$Hal—Mg—CH_2—CH(R_3)—CH_2—A$$

wherein $R_3$ and A have the aforeindicated meanings, water is split off from the reaction product, and thereafter the compound thus obtained is converted in the conventional manner, i.e., by treatment with alcoholic hydrochloric acid or an alkyl halide, into the corresponding salt or quaternary ammonium compound.

In accordance with the invention, it has now been found that compounds of the formula:

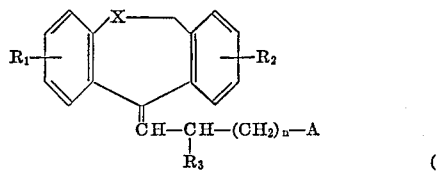

(I)

wherein X, $R_1$, $R_2$, $R_3$, A and $n$ are as above defined, can be produced in a simple and easy manner and in very good yields by reacting a compound of the Formula III

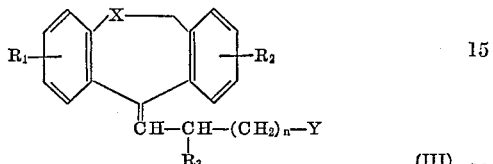

(III)

wherein X, $R_1$, $R_2$, $R_3$ and $n$ are as above defined and Y is a reactive ester group, with a compound of the formula H—A, wherein A has the same meaning as above set out.

The rection is conducted by boiling a mixture of the two reactants in an appropriate solvent as, for instance, a mixture of ethanol and tetrahydrofuran at normal or elevated pressures. After the conventional working up and purification treatments, the base of Formula I can be converted by conventional means into the corresponding acid addition or quaternary ammonium salts.

The advantage of the process of the invention over the process disclosed in the application cited above lies in the fact that starting from the same material III several compounds of Formula I can be obtained which have different basic radicals, i.e., compounds wherein A is a primary, secondary or tertiary amino group. In particular, compounds can also be prepared which contain basic groups having reactive substituents such as, for instance, the radicals 4-(β-hydroxyethyl)-piperidino or N'-(β-hydroxyethyl)-piperazino.

A further advantage of the process of the invention is to be found in the fact that compounds can be made having Formula I, wherein $n$ is equal to zero. The compounds in which the ring system and the basic group are linked only by two carbon atoms, cannot be made by the method described in the aforesaid U.S. application by reacting the ketone of Formula II with a Grignard compound, since it is not possible to convert the corresponding β-halogenethyl compounds into Grignard compounds (H. Gurien, J. Org. Chem. 28, 1963, p. 878; A. Marxer, Helv. Chim. Acta 24, 1941, page 209E).

The preparation of the new starting products of the Formula III is realized in several ways as follows:

(1) The dibenzo-[b,e]-oxepine-11-ones and dibenzo-[b,e]-thiepine-11-ones of Formula II, prepared as shown in the above-mentioned U.S. application Ser. No. 227,552, are reacted with a Grignard compound of the formula Hal—Mg—$CH_2$—$CH(R_3)$—$(CH_2)_n$—OR', wherein $R_3$ and $n$ are as above defined and R' is an alkyl group, especially methyl- or terbutylgroup or an aralkyl group, especially a benzylgroup, to obtain compounds of the Formula IV. These carbinols of Formula IV are directly converted by boiling with aqueous hydrobromic acid into the starting material of the Formula III (Y=Br). Another way is first boiling the carbinols of Formula IV wherein R' is a methyl- or benzylgroup with acetylchloride in benzene or with alcoholic hydrochloric acid to get the alkyliden-compounds of the Formula V and then spliting off $R_3$ and introducing Y by boiling with hydrobromic acid to get compounds of Formula III (Y=Br). When boiling carbinols of Formula IV wherein R' is a terbutylgroup with alcoholic hydrochloric acid compounds of Formula VI are obtained, which are converted to the desired starting material of Formula III by thionyl chloride (Y=Cl).

The reaction scheme corresponding to the above is as follows:

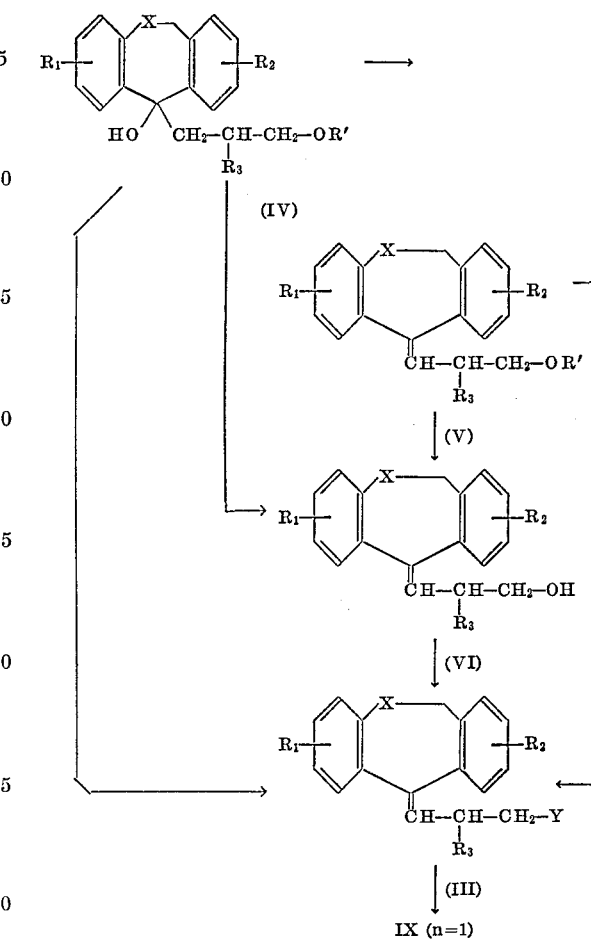

IX (n=1)

It has furthermore been found that it is possible to obtain compounds of Formula III where $n=1$ and Y=bromine by the Grignardization of componds having the Formula II with compounds

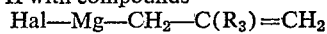
Hal—Mg—$CH_2$—$C(R_3)$=$CH_2$ where Hal and $R_3$ have the same meaning as given above, followed by the addition to the resulting compound of hydrogen bromide.

It is also possible, in accordance with the invention, to react compounds having Formula II with Grignard compounds of the Formula:

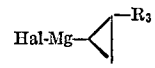

where Hal and $R_3$ are as above defined, to form the corresponding carbinols, and to convert the carbinol by treating the same with aqueous hydrobromic acid into compounds of Formula II, where $n=1$ and Y is bromine.

It is also possible to prepare compounds of Formula III with $n=0$ by the following procedure: A ketone of the Formula II is reacted first with α-bromoacetic acid ester of the formula Br—$CH_2$—$COOC_2H_5$ according to the Reformatzky synthesis to produce compounds of the Formula VII and thereafter reducing the VII compounds with lithium aluminum hydride to the corresponding alcohols of Formula VIII. The procedure as set out above in connection with the treatment of the compounds of Formula VI is then followed. The reaction scheme for this latter method is set out below:

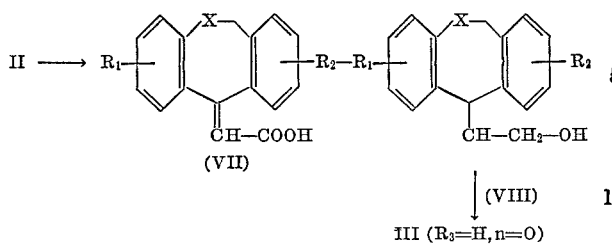

The new basic dibenzo-[b,e]-oxepine and dibenzo-[b,e]-thiepine derivatives may be represented by the formula:

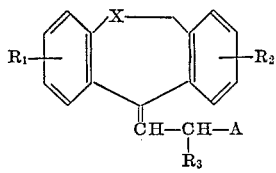

wherein X, $R_1$, $R_2$, $R_3$ and A are as above defined.

The compounds having the following formula constitute a preferred group being characterized by their outstanding psychodynamic activity:

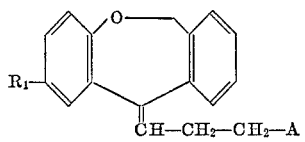

wherein $R_1$ is hydrogen or halogen and A is 4-(β-hydroxyethyl)-piperidino.

The compounds of the invention may be used in the form of the free bases or in the form of acid addition or quaternary ammonium salts.

The term "salts" as used herein is intended to include all non-toxic or pharmacologically acceptable salts of the basic compounds, including both the acid addition salts and the quaternary ammonium salts.

The bases of the foregoing type form salts with a variety of inorganic and strong organic acids including sulfuric, ascorbic, hydrochloric, hydrobromic, sulfamic, citric, oxalic, and related acids. They also form quaternary ammonium salts with a variety of organic esters of sulfuric, hydrohalic, and aromatic sulfonic acids. Among such esters are methylchloride and bromide, ethylchloride, propylchloride, butylchloride, isobutylchloride, benzylchloride, and bromides; phenethylbromide, naphthylmethylchloride, dimethylsulfate, diethylsulfate, methylbenzenesulfonate, ethyltoluenesulfonate, ethylenechlorohydrin, propylene, chlorohydrin, allylbromide, methylallylbromide, and crotylbromide.

The acid addition salts may be suitably prepared directly from the reaction mixture by acidifying with dilute acid, such as hydrochloric acid. The alkylhalide quaternary salts are suitably prepared by treating the base in an anhydrous solvent medium with an excess of the alkylhalide and recrystallizing the product from ethanol.

The following examples are added to illustrate the preparation of representative compounds provided by the invention but it is to be understood that the invention shall not thereby be restricted.

EXAMPLE 1

11-(3-dimethylamino-propylidene)-6,11-dihydro-dibenzo-[b,e]-thiepine

METHOD I (a) 48 ml. benzyloxypropyl chloride-(3) (obtained according to Bennett and Hock, Soc. 1927, p. 473 and 476) and 6.3 g. magnesium in 100 ml. ether were used in the conventional manner in the presence of 1 ml. of methyl iodide to prepare the Grignard compound. The contents of the flask were heated at ebullition for about 2 hours, until all of the magnesium had been consumed, and thereafter 38.8 grams 6,11-dihydro-dibenzo-[b,e]-thiepine-11-one dissolved in a mixture of 70 ml. tetrahydrofuran and ether (1:1) were added dropwise at room temperature, whereupon the reaction mixture slowly came to a boil. The reaction mixture was heated for 4 hours at ebullition, ammonium chloride solution added when the mixture had cooled, and the mixture was then extracted with ether. The combined and dried solvent extracts were freed of solvent and the oily residue (75.8 g.) brought to crystallization by treatment with 115 ml. ligroin and ether (9:1). 43.5 grams of 11-(3-benzyloxypropyl) - 11-hydroxy-6,11-dihydrodibenzo-[b,e]-thiepine having a melting point of 69–73° C. were thus obtained (68.5% of theory). After recrystallization from isopropanol, the melting point rose to 76–77° C.

(b) 10 grams of the 11-(3-benzyloxypropyl)-11-hydroxy-6,11-dihydro-dibenzo-[b,e]-thiepine and 20 ml. acetyl chloride were heated for 1 hour in 100 ml. chloroform. The volatile fractions were removed under vacuum on the water bath and the residue distilled using high vacuum. The yield of 11-(3-benzyloxypropylidene)-6,11-dihydro-dibenzo-[b,e]-thiepine having a $B.P._{0.1}$ 245–250° C. amounted to 8.4 g. (88.5% of theory).

(c) 16.5 grams of the 11-(3-benzyloxypropylidene)-6,11-dihydro-dibenzo-[b,e]-thiepine thus obtained were heated with 100 ml. 48% hydrobromic acid for 3 hours at ebullition, with stirring. After the reaction had ended, the mixture was diluted with water, extracted with ether, and the combined ether extracts washed until neutral, dried and freed of solvent. The crude product (18.3 g.) was crystallized with a mixture of ligroin and ether. In this manner, 6.6 g. of 11-(3-bromopropylidene)-6,11-dihydro-dibenzo-[b,e]-thiepine having a melting point of 132–136° C. (43.5% of theory) were obtained. By recrystallization from cyclohexane, the melting point was raised to 142–143° C.

(d) 3.3 grams (0.01 mol) of the 11-(3-bromopropylidene)-6,11-dihydro-dibenzo-[b,e]-thiepine obtained as just set out, were dissolved in 15 ml. tetrahydrofuran and heated together with a solution of 2.7 g. (0.06 mol) dimethylamine in 10 ml. ethanol for 3 hours using a glass autoclave and a temperature of 95–100° C. (boiling water bath). Water and 6 N hydrochloric acid were added to the contents of the autoclave and the mixture was extracted with ether. The separated, aqueous-acid components were then made alkaline with dilute caustic soda solution, and the oil thereby separated was taken up in ether. The ether residue, after distillation in a high vacuum, produced 1.8 g. (61% of theory) of 11-(3-dimethylaminopropylidene) - 6,11 - dihydro-dibenzo-[b,e]-thiepine having a $B.P._{0.1}$ 176–178° C.; melting point of the hydrochloride: 218–220° C. (from isopropanol).

SIMPLIFIED METHOD II 22.6 g. (0.1 mol) 6,11-dihydro-dibenzo-[b,e]-thiepine-11-one were dissolved in 20 ml. tetrahydrofuran and 20 ml. ether, as described above in part (a), were reacted with 3.6 g. (0.15 gramatom) magnesium and 28 grams (0.2 mol) benzyloxypropyl chloride in 60 ml. ether. Following decomposition with ammonium chloride solution, 51.1 grams of crude 11-(3-benzyloxypropyl)-11-hydroxy-6,11-dihydro-dibenzo-[b,e]-thiepine were obtained. The crude product was heated at abullition for 1 hour with 200 ml. of about 3 N alcoholic hydrochloric acid. After removal of the solvent by evaporation, high-vacuum distillation gave 29.2 grams 11-(3-benzyloxypropylidene)-6,11-dihydro-dibenzo-[b,e]-thiepine. This amounted to a yield of 81.5% (with reference to the initial thiepinone derivative).

13.5 grams of this benzyloxypropylidene compound and 80 ml. 48% hydrobromic acid were heated at ebullition for 3 hours and processed as described above under part (c). The crude bromopropylidene compound thus obtained (15 g.) was taken up in 37 ml. tetrahydrofuran and brought to reaction as described above under (d) with 9.8 g. dimethylamine in 37 ml. absolute ethanol. After the high-vacuum distillation, 4.3 g. 11-(3-dimethylaminopropylidene) - 6,11-dihydro-dibenzo-[b,e]-thiepine having a B.P.$_{0.1}$ 168–175° C. were obtained; M.P. of the hydrochloride: 216–218° C. (from isopropanol). The yield amounted to 38.5% (with reference to the benzyloxypropylidene compound) or 31.5% (with reference to the thiepinone derivative used as starting material).

EXAMPLE 2

11-(3-monomethylamino-propylidene)-6,11-dihydro-dibenzo-[b,e]-thiepine 3.3 g. (0.01 mol) 11-(3-bromopropylidene)-6,11-dihydro-dibenzo-[b,e]-thiepine were dissolved in 15 ml. tetrahydrofuran and heated for 3 hours at 90 to 100° C. together with a solution of 2 g. (0.06 mol) monomethylamine in 10 ml. ethanol. Following processing analogous to Example 1(d), 1.4 g. (50% of theory) of 11-(3-monomethylamino-propylidene) - 6,11 - dihydro-dibenzo-[b,e]-thiepine having a B.P.$_{0.1}$ 183–187° C. were obtained; M.P. of the hydrochloride: 235–237° C. (from isopropanol).

EXAMPLE 3

11-(3-[4-(2-hydroxyethyl)-piperidyl]-propylidene)-6,11-dihydro-dibenzo-[b,e]-thiepine 16.5 g. (0.05 mol) 11-(3-bromopropylidene)-6,11-dihydro-dibenzo-[b,e]-thiepine were dissolved in 75 ml. tetrahydrofuran and heated at ebullition for 5 hours together with 20 g. (0.15 mol) 4-(2-hydroxyethyl)-piperidine (prepared according to K. Stach et al., Mh. Chem. 93, 1962, p. 1090). Following the addition of dilute hydrochloric acid and ether, the aqueous acid components were separated, the mixture made alkaline with dilute caustic soda solution and extracted with ether. After distillation using a high vacuum, 11.9 g. (65.6% of theory) of 11 - (3-[4-(2-hydroxy-ethyl)-piperidyl]-propylidene)-6,11 - dihydro-dibenzo-[b,e]-thiepine, having a B.P.$_{0.01}$ 235–255° C. at a melting point of 50–52° C. were obtained from the ether residue.

EXAMPLE 4

11-(3-[4-(2-hydroxyethyl)-piperazinyl-(1)]-propylidene)-6,11-dihydro-dibenzo-[b,e]-thiepine 6 grams (0.018 mol) 11-(3-bromopropylidene)-6,11-dihydro-dibenzo-[b,e]-thiepine were dissolved in 30 ml. tetrahydrofuran and heated at ebullition for 5 hours together with 4.7 g. (0.036 mol) 4-(2-hydroxyethyl)-piperazine (prepared according to S. McElvain et al., J. Am. Chem. Soc. 76, 1954, p. 1126). The mixture was then processed as described in Example 3. 4.0 grams (44% of theory) of 11-(3-[4-(2-hydroxyethyl)-piperazinyl-(1)]-propylidene) - 6,11-dihydro-dibenzo-[b,e]-thiepine having a B.P.$_{0.02}$ of 245–255° C. were thus obtained.

EXAMPLE 5

11-(3-dimethylamino-propylidene)-6,11-dihydro-dibenzo-[b,e]-oxepine (a) A Grignard compound was prepared in the conventional manner from 4.8 g. (0.2 gram-atom) magnesium in 100 ml. ether and 30 g. (34 ml.) (3-chloropropyl)-tertbutyl-ether and 16.40 grams (0.078 mol) 6,11-dihydro-dibenzo-[b,e]-oxepine-11-one dissolved in 100 ml. ether were added in dropwise fashion so that the contents of the flask boiled lightly. The mixture was heated for 1 hour with agitation in a reflux condenser to complete the reaction and then it was decomposed with ammonium chloride solution. The product which was obtained by separating, drying and eliminating the solvent produced, when the ether residue (24.0 g.) was extracted with ligroin, amounted to 20.3 g. (80.0% of theory) of 11-(3-tertbutoxypropyl) - 11 - hydroxy - 6,11 - dihydro-dibenzo-[b,e]-oxepine, having a melting point of 124–126° C. The (3-chloropropyl)-tertbutyl ether was thereafter obtained in the following manner: 19 g. (0.2 mol) 1-chloropropanol-(3), 50 ml. liquid isobutylene and 0.5 ml. concentrated sulfuric acid were permitted to stand for 24 hours in an autoclave, then poured into excess sodium bicarbonate solution and extracted with ether. The ether solution was dried with calcium chloride and distilled. 23.6 grams of (3-chloropropyl)-tertbutylether having a boiling point of 150–156° C. (78% of theory) were recovered.

(b) 30.8 grams of the 11-(3-tertbutoxypropyl)-11-hydroxy - 6,11 - dihydro-dibenzo-[b,e]-oxepine obtained according to (a) above and 150 ml. absolute alcoholic hydrochloric acid were heated for 1 hour at ebullition. After removing the solvent by evaporation, the residue was crystallized with ligroin, 21.0 grams (88.5% of theory) of 11-(3-hydroxypropylidene)-6,11 - dihydrodibenzo-[b,e]-oxepine having a melting point of 108–111° C. were obtained. After recrystallization from acetic acid ester, the compound melted at 112–114° C.

(c) 5.0 ml. thionyl chloride dissolved in 5 ml. benzene were added dropwise at room temperature to 12.6 g. (0.05 mol) of the 11-(3-hydroxypropylidene)-6,11-dihydro-dibenzo-[b,e]-oxepine obtained in part (b) above. After 1 hour of standing, the contents of the flask were heated at ebullition for 2 hours. The volatile components were thereafter removed and the remainder distilled using high vacuum. The yield amounted to 10.6 g. (78.5% of theory) of 11 - (3 - chloropropylidene)-6,11-dihydro-dibenzo-[b,e]-oxepine having a B.P.$_{0.1}$ 169–172° C., a melting point of 106–111° C. After recrystallization from 20 ml. of acetic acid ester, 9.1 g. (67.5% of theory) of pure product having a melting point of 113–115° C. were obtained. The crude product can however be used quite easily for further processing.

(d) 5.4 g. (0.02 mol) of the 11-(3-chloropropylidene)-6,11-dihydro-diberizo-[b,e]-oxepine, prepared according to (c) above, in 20 ml. tetrahydrofuran and 5.5 g. (0.12 mol) dimethylamine in 20 ml. ethanol were heated together for 3 hours in a glass autoclave. Further processing was carried out as described in Example 1(d). The yield of 11-(3-dimethylamino-propylidene)-6,11-dihydro-dibenzo-[b,e]-oxepine, having a B.P.$_{0.01}$ of 147–150° C. came to 4.1 g. (73.5% of theory). The melting point of the hydrochloride was 182–184° C. (recrystallized from isopropanol).

A simplified process is possible with this oxepine derivative as in the case of Example 1, Method II, without the 11-(3 - tertbutoxypropyl)-11-hydroxy-6,11-dihydro-dibenzo- [b,e]-oxepine having to be isolated. Starting with 28.0 grams 6,11-dihydro-dibenzo-[b,e]-oxepine - 11 - one, 9,6 grams magnesium and 68 ml. (3-chloropropyl)-tertbutyl-ether in 400 ml. ether, it is possible in accordance with the invention to recover 11-(3-hydroxy-propylidene)-6,11-dihydro-dibenzo-[b,e]-oxepine, M.P. 105–109° C. in a yield of 72%, which can be further processed as described in (c) above and (d).

EXAMPLE 6

11-(3-monomethylamino-propylidene)-6,11-dihydro-dibenzo-[b,e]-oxepine 5.4 g. (0.02 mol) 11-(3-chloropropylidene)-6,11-dihydro-dibenzo-[b,e]-oxepine in 20 ml. tetrahydrofuran and 3.7 g. (0.12 mol) monomethylamine in 20 ml. ethanol are reacted and further processed as described in Example 1(a) above. 3.6 grams (68.0% of theory) of 11-(3-monomethylamino-propylidene) - 6,11 - dihydro-dibenzo-[b,e]-oxepine having a B.P.$_{0.01}$ 158–165° C. and a melting point of 60–62° C. were thereby obtained.

EXAMPLE 7

11-(3-[4-(2-hydroxyethyl)-piperazinyl-(1)]-propylidene)-6,11-dihydro-dibenzo-[b,e]-oxepine 6.5 grams of the methanesulfo acid ester of 11-(3-hydroxypropylidene) - 6,11 - dihydro-dibenzo-[b,e]-oxepine and 6 g. N-β-hydroxyethyl-piperazine were dissolved in 30 ml. absolute tetrahydrofuran and heated at ebullition for 2 hours. After the addition of water and ether, the ethereal components were separated off and extracted repeatedly with water, followed by extraction with dilute hydrochloric acid. The aqueous-acid solution was then made alkaline with caustic soda solution and extracted with ether. The residue of the ether extract was dissolved in absolute ether, and an ethereal solution of hydrochloric acid used to precipitate the corresponding hydrochloride. The hydrochloride was briefly boiled in dioxane after filtration. In this manner, 4.3 g. of the dihydro-chloride of 11-(3-[4-(2-hydroxyethyl) - piperazinyl-(1)] - propylidene)-6,11-dihydro-dibenzo-[b,e]-oxepine (43% of theory) having a melting point of 231–232° C. were obtained. The compound crystallized with ¼ mol of water of crystallization.

The methanesulfonic acid ester of 11-(3-hydroxy-propylidene)-6,11-dihydro-dibenzo-[b,e]-oxepine used as the starting product was manufactured as follows: 7.0 grams 11 - (3 - hydroxypropylidene)-6,11-dihydro-dibenzo-[b,e]-oxepine were dissolved in 45 ml. pyridine and chilled to 0° C. 5.8 grams of methanesulfo acid chloride were then added dropwise with agitation, at 0 to 3° C. The agitation was continued for 30 minutes at 0° C. and then for 1 hour at 20° C. The reaction product was poured onto ice, water and ether were added, and the ethereal components were treated with dilute, aqueous hydrochloric acid and then with water. After drying the ethereal components with sodium sulfate, the solvent was evaporated to a small volume, whereupon a moist crystal mass separated. 6.6 grams of the ester (71.7% of theory), having a melting point of 105–107° C. were obtained.

EXAMPLE 8

11 - (3 - [4-(2-hydroxyethyl)-piperidyl]-propylidene)-6,11-dihydro-dibenzo-[b,e]-oxepine In a manner analogous to that described in Example 7 above, there were obtained from 6.0 grams of the methanesulfo acid ester of 11-(3-hydroxypropylidene)-6,11-dihydro-dibenzo-[b,e]-oxepine and 5.6 g. β-hydroxyethyl-piperidine, 6.7 grams of crude 11-(3-[4-(2-hydroxyethyl)-piperidyl] - propylidene) - 6,11-dihydro-dibenzo-[b,e]-oxepine (88% of theory). It was possible with ethereal hydrochloric acid to precipitate the corresponding hydrochloride from a solution of this compound in absolute ether, which, after recrystallization from a mixture of isopropanol and acetic acid ester (1:1), melted at 193–195° C. The yield of compound amounted to 6.5 g. (79% of theory). The compound crystallized with 1 mol of water of crystallization.

EXAMPLE 9

2 - chloro-11-(3-[4-(2-hydroxyethyl)-piperidyl]-propylidene)-6,11-dihydro-dibenzo-[b,e]-oxepine A procedure analogous to that described in Example 8 above was followed. There were thusly obtained from 13.4 grams of the methanesulfo acid ester of 2-chloro-11-(3 - hydroxypropylidene) - 6,11-dihydro-dibenzo-[b,e]-oxepine and 9.5 grams of β-hydroxyethyl-piperidine in 75 ml. tetrahydrofuran, crude 2-chloro-11-(3-[4-(2-hydroxyethyl) - piperidyl]-propylidene)-6,11-dihydro - dibenzo-[b,e]-oxepine. The free base was precipitated from an ethereal solution with ethereal hydrochloric acid as the acid addition salt of hydrochloric acid. After boiling two times in 150 ml. acetone and filtering, the yield of compound amounted to 10 g. (63% of theory) and had a melting point of 227–230° C.

Compounds falling within the scope of the instant invention were compared for therapeutic activity, i.e., pharmacological effect and toxicity with known compounds disclosed in Belgian Patent 623,259 (German Patent 1,232,161). The comparative tests which were carried out included the following:

(1) Toxicity.—Determination of the $LD_{50}$ in mice (in mg./kg., subcutaneous).

(2) Hypnotic potentiation of urethane (HPU).—Determination of the $ED_{50}$ in mice (in mg./kg., subcutaneous). The HPU test applies to the sedative components. The animals first received the substance being tested and 15 minutes later, one gram per kilogram of urethane administered intraperitoneally. The latter constitutes a sub-hypnotic dose which causes the animals merely to assume a recumbent or lying down position. The effect of the urethane becomes apparent 15 to 30 minutes after injection. The doses of test substance were determined which caused 50% of the animals to assume the recumbent or supine position.

(3) Inhibition of secondarily conditioned reactions.—Determination of the $ED_{50}$ for rats (mg./kg., subcut.). Maffii's method was used (Journal of Pharm. and Pharmacol., 11, 129/1959). In accordance with the method described therein, rats were trained to respond to a buzzer sound combined with a shock by fleeing from a dark part of the cage to a lighter part. Later on, the buzzer tone alone sufficed to produce the reaction (conditioned reaction or reflex), and finally the stimulus of the cage alone (the environment) sufficed to make the rats flee (secondary conditioned reaction). In the experiments the inhibition of the SCR [1] was evaluated, that is, the dose determined which inhibited the SCR in 50% of the rats.

The SCR inhibition serves as a measure of the suppression of emotions and impulses on which the effectiveness of the substance in the treatment of psychoses is based, i.e., it is used to determine the neuroleptic effect of the compound.

(4) Stimulating effect in the pigeon.—The pigeon is particularly well suited as a test animal in evaluating the compounds set out below as it is not sensitive to the sedative components of activity of the test compounds. The procedure involved is that which is based on the principle of the palpebral tests described by Janssen, Arzneimittelforschung 11 (1961) pp. 819–824. The person conducting the experiment is supplied with pairs of animals, to one of which saline solution was administered and to the other of which the test substances has been given. The individual conducting the test must observe the animals and decide which of the two is more agitated. If his decision is based on a guess, then he assigns to the selected animal one point. If he believes he sees a difference in the state of the two animals, then the animal he selects is given two points. If he is sure there is a difference in the state of the two animals, the animal which he selects as more agitated is given three points. Each set of animals is evaluated by two entirely different observers. When an animal has been correctly chosen, the same is indicated in the report by a plus (+) sign and, incorrectly chosen animals by a minus (−) sign. Using this system of notation, the average values may vary between −3 and +3. In order to evaluate the results, the figures are converted into percentage values by substituting a zero for −3 and 100% for +3. The percentage values are then plotted on a logarithmic probability graph in order to even out the curve which is formed by the maximum number or value of the three points of the dose activity curve. Thereafter, the $ED_{75}$ was determined as that value which corresponded to an average of +1.5 points. In the test procedure, the pigeons were kept in a completely quiet room, in cages measuring 40 x 40 x 40 cm. and were observed through a one-way mirror, i.e., the animals were not able to see the observer. It is only under such rigidly maintained test conditions that the untreated animal will have relaxed as is evidenced by its sitting down in the cage or cleaning itself. Agitation is evidenced by the fact that the animals get up, walk about, and look quickly to one side or the other.

[1] (SCR—secondary conditioned reaction).

The following compounds were employed in the tests:
A. 11-(3-[4-(2-hydroxyethyl)-piperidyl]-propylidene)-6,11-dihydro-dibenzo-[b,e]-oxepine (Example 8)
B. 2-chloro-11-(3-[4-(2-hydroxyethyl)-piperidyl]-propylidene)-6,11-dihydro-dibenzo-[b,e]-oxepine Example 9)

As comparison compounds there were employed the following compounds disclosed in Belgian Patent 623,259 and corresponding to German Patent 1,232,161.

C. 11-(3'-dimethylamino-propylidene)-dibenzo-[b,e]-oxepine
D. 11-[3'-(N'-methyl-N-piperazinyl)-propylidene]-dibenzo-[b,e]-oxepine
E. 11-(3'-dimethylamino-propylidene)-2-methyl-dibenzo-[b,e]-oxepine
F. 11-(3'-dimethylamino-propylidene)-2-methoxy-dibenzo-[b,e]-oxepine The results of the experiments are set out in the following table:

TABLE

| Compound | $LD_{50}$ in the mouse, mg./kg. (Subc.) | Urethane sleep potentiation in the mouse, $ED_{50}$ mg/kg. after 30 min. I.P. | Stimulating effect in pigeons, $ED_{75}$ mg./kg. after 60 min. I.P. | Inhibition of secondary conditioned reflexes in rats, $ED_{50}$ mg./kg., I.P. 2–4 hrs. |
|---|---|---|---|---|
| A | <200 | 2.6 | (¹) | 10 |
| B | <200 | 0.3 | (¹) | 1.1 |
| C | 310 | 4.1 | 7.1 | (²) |
| D | 630 | 3.5 | 10 | (²) |
| E | 255 | 7.1 | 10 | (²) |
| F | 465 | 5.5 | 10 | (²) |

¹ Ineffective.
² Ineffective by more than 10.

As can be seen from the above, the compounds i.e., 2-hydroxyethyl-piperidyl derivatives in accordance with the invention manifest an entirely different mode of action than the comparison compounds. The 2-hydroxyethyl-piperidyl derivatives in accordance with the invention exhibit a substantially stronger sedative component as measured by the urethane sleep potentiation in mice and do not have any impulse stimulating effect, i.e., they do not induce agitation as determined by the tests carried out with the pigeons. In addition the compounds in accordance with the invention exhibit a marked inhibition on the secondary conditioned reactions or reflexes as determined in the rat experiment. The inhibition of secondarily conditioned reactions is equivalent to the production of an antipsychotic effect in clinical testing.

The compounds in accordance with the invention are possessed of excellent sleep inducing activity and antipsychotic activity not observed with any of the known compounds as the toxicity of the compounds is of the same order of magnitude as the known compounds, the compounds in accordance with the invention constitute valuable medicinal agents employable over a very broad therapeutic range to produce effects not heretofore achievable with one compound.

The end products of this invention may be combined with a pharmaceutical carrier for administration to humans in an amount to obtain the desired pharmacodynamic effect, for instance tranquilizing effect. Such carriers are either solid or liquid. Exemplary of solid pharmaceutical carriers are: lactose, corn starch, mannitol, talc, etc. The compounds of this invention are mixed with the carrier and built into hard gelatin capsules or tableted with suitable tableting aids, such as magnesium stearate, starch, or other lubricants, disintegrants, or coloring agents. This combination may be with a liquid carrier if desired, in which event a soft gelatin capsule is filled with a slurry of the novel compound in soy bean or peanut oil. Aqueous suspensions or solutions are prepared for alternate oral or parenteral administration.

It is not desired to be limited except as set forth in the following claims.

What is claimed is:
1. A member of the group consisting of compounds of the formula:

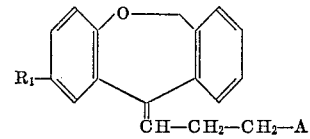

wherein $R_1$ is a member of the group consisting of hydrogen and halogen and A is 4-(β-hydroxyethyl)-piperidino, non-toxic acid addition salts thereof and non-toxic quaternary ammonium salts thereof.

2. A compound according to claim 1 designated 11-(3 - [4 - (2 - hydroxyethyl) - piperidyl] - propylidene)-6,11-dihydro-dibenzo-[b,e]-oxepine.

3. A compound according to claim 1 designated 2-chloro - 11 - (3 - [4 - (2 - hydroxyethyl) - piperidyl]-propylidene)-6,11-dihydro-dibenzo-[b,e]-oxepine.

References Cited

UNITED STATES PATENTS 3,193,549  7/1965  Zenitz _____ 260—240 XR

FOREIGN PATENTS 623,259  4/1963  Belgium.

JOHN D. RANDOLPH, *Primary Examiner.*

U.S. Cl. X.R.

260—327, 333; 424—267, 275, 278